(12) United States Patent
Mori

(10) Patent No.: US 7,952,258 B2
(45) Date of Patent: May 31, 2011

(54) VIBRATION-TYPE ACTUATOR

(75) Inventor: Takao Mori, Tokyo (JP)

(73) Assignee: Canon Kabushiki Kaisha (JP)

( * ) Notice: Subject to any disclaimer, the term of this patent is extended or adjusted under 35 U.S.C. 154(b) by 236 days.

(21) Appl. No.: 12/092,931

(22) PCT Filed: Oct. 11, 2007

(86) PCT No.: PCT/JP2007/070494
§ 371 (c)(1),
(2), (4) Date: May 7, 2008

(87) PCT Pub. No.: WO2008/056528
PCT Pub. Date: May 15, 2008

(65) Prior Publication Data
US 2009/0167111 A1 Jul. 2, 2009

(30) Foreign Application Priority Data

Nov. 8, 2006 (JP) ................................ 2006-302756

(51) Int. Cl.
*H01L 41/04* (2006.01)
(52) U.S. Cl. ................ 310/323.01; 310/323.03; 310/328
(58) Field of Classification Search ....... 310/323.01–323.21, 324, 328, 310/330–332
See application file for complete search history.

(56) References Cited

U.S. PATENT DOCUMENTS 5,049,775 A * 9/1991 Smits ........................... 310/328

FOREIGN PATENT DOCUMENTS

| JP | 63-15679 A | 1/1988 |
|----|-----------|--------|
| JP | 3-113994 U | 11/1991 |
| JP | 3-113995 U | 11/1991 |
| JP | 5-252764 A | 9/1993 |
| JP | 8-103088 A | 4/1996 |
| JP | 2004-304887 A | 10/2004 |

OTHER PUBLICATIONS

Written Opinion issued in corresponding application No. PCT/JP2007/070494, dated Jan. 15, 2008.
International Search Report issued in corresponding application No. PCT/JP2007/070494, dated Jan. 15, 2008.

\* cited by examiner

*Primary Examiner* — Derek J Rosenau
(74) *Attorney, Agent, or Firm* — Rossi, Kimms & McDowell LLP

(57) ABSTRACT

A vibration-type actuator having a vibrating body adapted to be deformed for driving and mounted with a contact member having a spring function. The contact member is comprised of a protruding portion adapted to be in contact with a driven body and fixing portions fixed to the vibrating body, and is provided with converting portion disposed between the projecting portion and the fixing portions. The converting portions each have an inclined surface obliquely extending relative to a contact surface provided in the protruding portion for contact with the driven body and extending to a side opposite from the contact surface. The converting portions convert a change in relative distance between the fixing portions caused by deformation of the vibrating body into a displacement of the contact surface.

8 Claims, 15 Drawing Sheets

FIG. 1
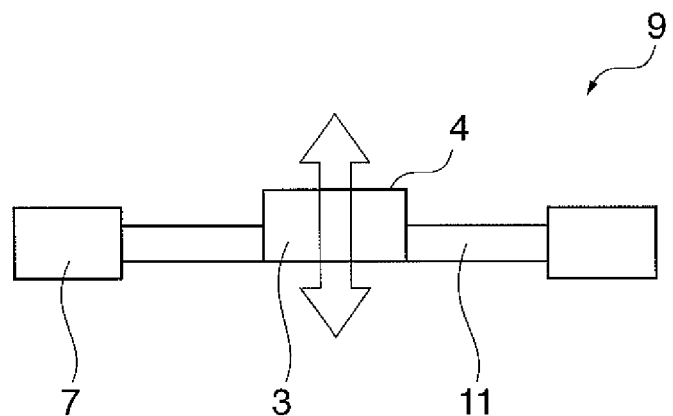
FIG. 2A
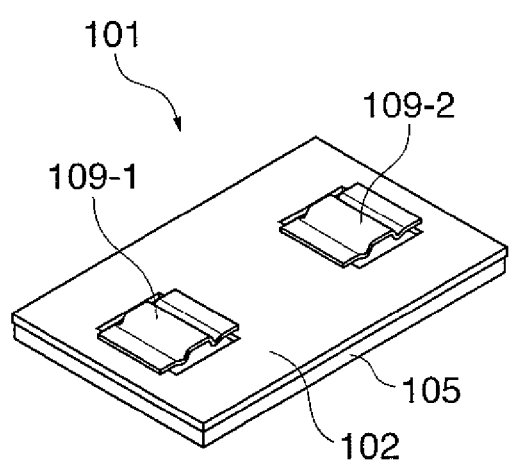
FIG. 2B
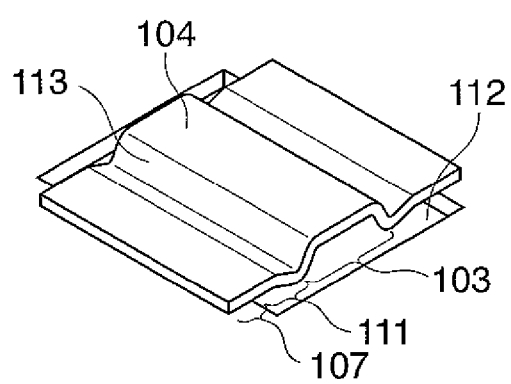
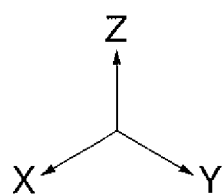

*FIG. 10A*  *FIG. 10B*
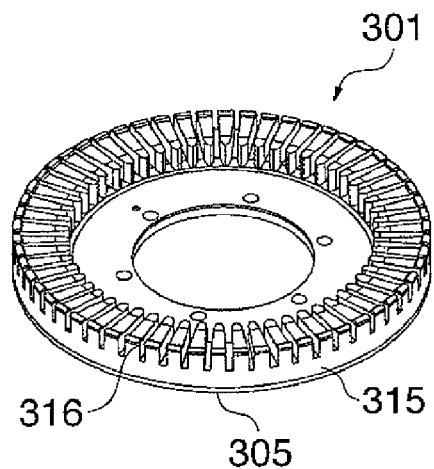
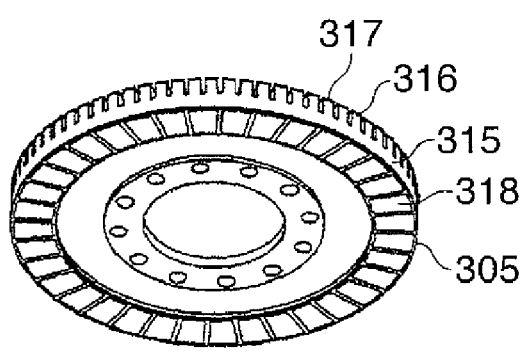
*FIG. 11*
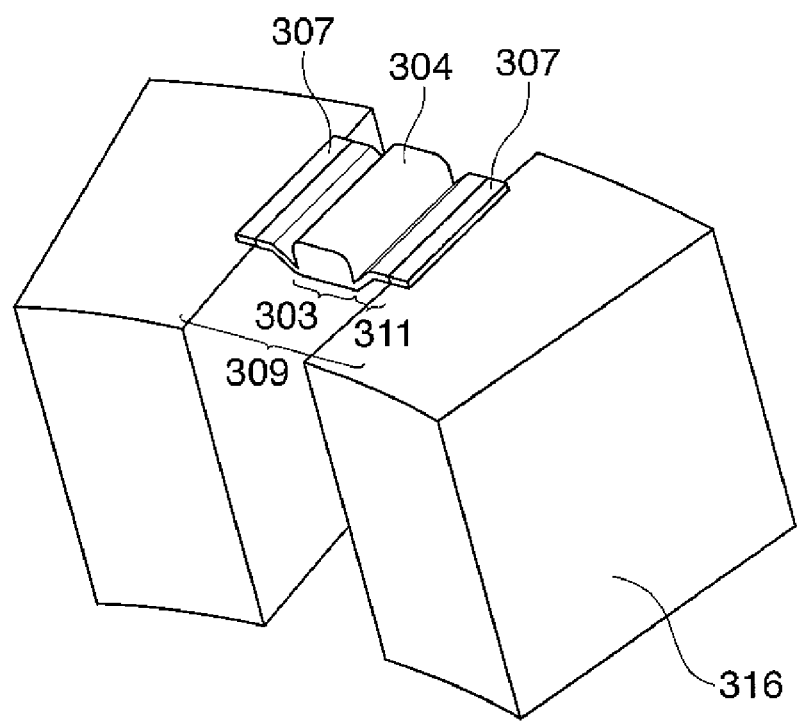

US 7,952,258 B2

VIBRATION-TYPE ACTUATOR

This application is a U. S. National Phase Application of PCT International Application PCT/JP2007/070494, filed on Oct. 11, 2007, which is based on and claims priority from JP 2006-302756 filed on Nov. 8, 2006. The contents of these applications in their entity are incorporated herein by reference.

TECHNICAL FIELD

The present invention relates to a vibration-type actuator, such as an ultrasonic motor, for generating vibrations in an elastic body and utilizing the resultant vibrational energy to generate a driving force.

BACKGROUND ART

Heretofore, various proposals have been made for an ultrasonic motor of a type linearly driving a driven element. Such an ultrasonic motor is disclosed, for example, in Japanese Laid-open Patent Publication No. 2004-304887. The driving principle of this motor is described below with reference to FIGS. 17, 18A, and 18B.

FIG. 17 is a perspective view showing the appearance of a linear-type ultrasonic motor.

As shown in FIG. 17, the linear-type ultrasonic motor 510 is comprised of a vibrator 501 and a linear slider 506. The vibrator 501 includes a piezoelectric element 505 formed into a rectangular thin plate, and a vibrating body 502 integrally joined to one surface of the piezoelectric element 505. The vibrating body 502 has a rectangular-shaped base and two protruding portions 503-1, 503-2 projecting from an upper surface of the base.

FIGS. 18A and 18B are views showing the forms of two vibration modes (MODE-A and MODE-B) excited in the vibrator of FIG. 17.

Each of the two vibration modes is a bending vibration mode excited in the out-of-plane direction of the plate-shaped vibrator 501. The vibrator 501 is designed such as to resonate in these modes at frequencies approximately equal to each other.

Two lower parts of FIG. 18A show the vibrator 501 as seen from the Y direction. When the MODE-A vibration is excited in the vibrator 501, there are formed three vibration nodes α as shown in the lowest part of FIG. 18A (a second-order bending vibration mode). Each vibration node extends in the Y direction of the vibrator 501

As shown in FIG. 18A, the rectangular column-shaped contact members 503-1, 503-2 are disposed in the vicinity of the nodes formed by the MODE-A vibration. The MODE-A vibration causes contact surfaces 504-1, 504-2 of the contact members 503-1, 503-2 to reciprocally move in the X direction, as shown by an arrow.

Two lower parts of FIG. 18B show the vibrator 501 as seen from the X direction. When the MODE-B vibration is excited in the vibrator 501, two vibration nodes β are formed (a first-order bending vibration mode), as shown in the lowest part of FIG. 18B. Each vibration node extends in the X direction of the vibrator 501. Thus, the nodes generated in the MODE-A vibration and the nodes generated in the MODE-B vibration extend perpendicular to each other in the XY plane.

As shown in FIG. 18B, the contact members 503-1, 503-2 are disposed in the vicinity of the antinode formed by the MODE-B vibration. The MODE-B vibration causes a reciprocal motion of the contact surfaces 504-1, 504-2 in the Z direction.

The above-described vibration modes are excited in the vibrator 501 by an inverse piezoelectric effect caused when a desired AC signal is input to the piezoelectric element 505. When the excitation is such that a phase difference between the MODE-A vibration and the MODE-B vibration is nearly equal to $+\pi/2$ or $-\pi/2$, near elliptic motions of the contact surfaces 504-1, 504-2 are generated in the XZ plane in FIG. 17. By virtue of the elliptic motions, a relative displacement motion occurs between the vibrator 501 and the linear slider 506 disposed in pressure contact with the contact surfaces 504-1, 504-2.

Next, an explanation is given of a distortion generated in the vibrator 501 when the above described vibration modes are excited in the vibrator 501.

With reference to FIG. 18A, the case where the MODE-A vibration is generated is first described. Positive and negative signs (+), (−) in FIG. 18A each represent the direction of an X directional component of distortion observed when the vibrator 501 is deformed by the vibration (Ditto in FIG. 18B). The positive sign (+) represents that the piezoelectric element 505 is elongated in the X direction, and the negative sign (−) represents that the piezoelectric element 505 is contracted in the X direction.

The sings (+), (−) indicates that each half of the piezoelectric element 505 is divided into two regions in the thickness direction in terms of the direction of distortion. At the boundary between the two regions, there is a plane where the X directional distortion is not produced, which is referred to as the neutral plane T1. It is also understood that the sign (distortion direction) is reversed between both halves of the piezoelectric element 505 with respect to the X-direction center portion thereof (FIG. 18A).

In the case where the MODE-B vibration is generated, it is understood that the piezoelectric element 505 is divided into two regions in the thickness direction thereof in terms of the signs (+), (−) each representing the direction of the Y directional distortion of the piezoelectric element 505 (FIG. 18B). The boundary between the two regions is referred to as the neutral plane T2.

It is generally known that smooth contact can be achieved between a linear slider and contact members disposed in pressure contact therewith in an ultrasonic motor when each contact member has a spring function.

Nevertheless, in the prior art ultrasonic motor, both the linear slider 506 and the two contact members 503-1, 503-2 provided integrally with the vibrating body 502 are each made of an inorganic material that has no spring function in its structure, and therefore, smooth contact cannot be achieved.

The present inventors designed a contact member 609 having a spring function, which is shown in FIG. 19. The contact member 609 is comprised of a protruding portion 603, two fixing portions 607 that support the protruding portion 603, and spring portions 608. The protruding portion 603 is required to be formed into a protrusion having a contact surface 604 thereof disposed in contact with a linear slider (not shown), which is driven in the X direction in FIG. 19. Therefore, the protruding portion 603 includes shoulder portions 613 respectively extending from two long side edges of the contact surface 604 of a rectangular shape.

The two fixing portions 607 are disposed in a direction parallel to the moving direction of the linear slider at a distance therefrom. The vibration body 602 is formed with a groove 612 having a sufficient depth such that the spring portions 608, horizontally extending from the fixing portions 607, can each have a spring function.

With the introduction of the above described construction, however, the following new problem is exposed.

As described above, the signs (+), (−) respectively represent the elongation and contraction of the piezoelectric element in the X direction in the MODE-A of FIG. 18A. By virtue of the elongation and contraction in the X direction, the two fixing portions 607 of the contact member 609 are moved toward and away from each other in the X direction.

FIGS. 20A to 20C are views, as seen from the Y direction in FIG. 19, showing how the contact member 609 is deformed when the fixing portions 607 in FIG. 19 are elongated and contracted in the in-plane direction.

FIG. 20A shows a shape of the contact member 609 observed when no vibration is generated in the vibrator 601, FIG. 20B shows a shape of the contact member 609 observed when the fixing portions 607 are moved away from each other, and FIG. 20C show a shape of the contact member 609 observed when the fixing portions 607 are moved toward each other. Larger arrows each represent the direction of displacement of the contact surface 604. Due to deformation of the shoulder portions 613, the contact surface 604 is displaced in the Z direction (the vertical direction in FIGS. 20A to 20C) in synchronization with movements of the fixing portions 607. At the moment when the displacement of FIG. 18A is generated, the right-side protruding portion is located at the crest of vibration, and thus the contact member 609 disposed thereat is deformed as shown in FIG. 20B. On the other hand, since the left-side protruding portion is located at the trough of vibration, the contact member 609 disposed thereat is deformed as shown in FIG. 20C. Accordingly, in the arrangement where the two contact members 609 are used instead of the contact members 503-1, 503-2 of the vibrator of FIGS. 18A and 18B, the contact members 609 are displaced in the Z direction in antiphase with each other.

By making the phase difference between the reciprocal motion in the x direction in the MODE-A and the reciprocal motion in the Z direction in the MODE-B to be nearly equal to $+\pi/2$ or $-\pi/2$, near elliptic motion of the contact surface 604 is generated. In the arrangement using the contact member 609, however, in the MODE-A, the contact surface 604 makes a reciprocal motion that results from the combination of the displacement in the X direction and the displacement in the Z direction.

Specifically, as seen from the Y direction of the coordinate system of FIG. 19, a trajectory of FIG. 21B is obtained in the above described arrangement, which is different from a trajectory in the prior art example shown in FIG. 21A. Furthermore, in the MODE-A, two projections are displaced in the Z direction in antiphase with each other.

Therefore, if the trajectory of the contact surface 604 of one of the two contact members 609 is as shown in FIG. 21B, then the trajectory of another contact surface 604 becomes as shown in FIG. 21C.

For the above reasons, in the arrangement using the contact members each having a spring function, the direction of the reciprocal motion in the MODE-A is largely deviated from the horizontal direction, and as a result, the elliptic trajectory is distorted, thereby posing problems such that stable contact cannot be attained and unusual noise is generated, in addition to problems such as increase of sliding loss and acceleration of the progress of wear.

DISCLOSURE OF INVENTION

The present invention provides a vibration-type actuator, which comprises a vibrating body adapted to generate a bending vibration, a driven body adapted to be driven by the bending vibration generated in the vibrating body, and a contact member having a protruding portion fixed to the vibrating body via a plurality of fixing portions and adapted to be in contact with the driven body, wherein the contact member includes converting portions each disposed between the protruding portion and one of the plurality of fixing portions, wherein the converting portions each have a portion thereof extending obliquely relative to a contact surface provided in the protruding portion for contact with the driven body and extending toward a side opposite from the contact surface, and wherein the converting portions are adapted to convert a change in relative distance in a first axis direction between the plurality of fixing portions caused by deformation of the vibrating body into a displacement in a second axis direction perpendicular to the first axis direction.

BRIEF DESCRIPTION OF DRAWINGS

FIG. 1 is a view showing, for explanation of a contact member of a vibration-type actuator according to an exemplary embodiment of this invention, a structure formed by functional parts of the contact member;

FIG. 2A is a perspective view of a vibration-type actuator according to a first embodiment of this invention;

FIG. 2B is a perspective view of a contact member of the vibration-type actuator;

FIGS. 10A and 10B are perspective views each showing a vibrating body according to a third embodiment of this invention;

FIG. 11 is a perspective view showing an example of a ring-type ultrasonic motor mounted with a contact member;

BEST MODE FOR CARRYING OUT THE INVENTION

Figure 3A:
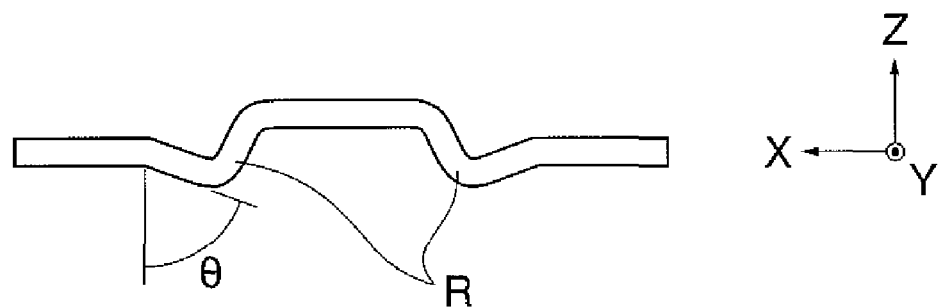
FIGS. 3A to 3C are views showing states of deformation of the contact member of FIGS. 2A and 2B.

The present invention will now be described in detail below with reference to the drawings showing preferred embodiments thereof.

FIG. 1 is a view showing, for explanation of a contact member of a vibration-type actuator according to an exemplary embodiment of this invention, a structure formed by functional parts of the contact member.

The contact member 9 is comprised of a protruding portion 3, fixing portions 7, and converting portions 11. The protruding portion 3 has a surface thereof formed with a contact surface 4 that is urged against a driven body for contact therewith. The fixing portions 7 are coupled to a base (a vibrating body 102, described later) that is deformed to drive the contact member 9, and are provided in plural in number so as to support the protruding portion 3 from opposite directions.

The converting portions 11 are each disposed between the protruding portion 3 and the fixing portion 7 concerned. When deformation such as bending vibration or longitudinal vibration is generated in the base, the fixing portions 7 are moved toward and away from each other in the in-plane direction. At that time, a change occurs in the relative distance between the fixing portions 7 in synchronization with the vibration. The converting portions 11 convert an amount of change in the relative distance into a contact surface displacement δ.

There are two forms of a method of utilizing the contact surface displacement δ produced when the vibrator is driven. A first form is to provide the converting portions 11 for suppression of an undesired amplitude of the contact surface 4, which can be caused by the vibration of the base used for driving the contact member 9. A second form is to provide the converting portions 11 at such positions where an undesired amplitude of the contact surface is suppressed to thereby attain much larger amplitude of the contact surface.

The first form is described in a first embodiment, and the second form is described in a second embodiment. Furthermore, third and fourth embodiments are described as exemplary application forms of the second embodiment.

FIG. 2A is a perspective view of a vibration-type actuator according to the first embodiment of this invention, and FIG. 2B is a perspective view of a contact member of the vibration-type actuator.

The actuator of this embodiment has a vibrator 101 having a piezoelectric element 105 and a vibrating body 102 on the piezoelectric element 105, and a construction having novel contact members 109-1, 109-2 that replace the two contact members 609 disposed in the vicinity of nodes of the MODE-A vibration generated in the above described prior art linear ultrasonic motor. The contact members 109-1, 109-2 are separate members from the vibrating body 102 which is the base, and are fixed to the vibrating body 102 after being formed into a shape shown in FIG. 2B.

The contact members 109-1, 109-2 are each comprised of a protruding portion 103, two fixing portions 107 that support the protruding portion 103, and converting portions 111. The protruding portion 103 is required to be formed into a protrusion having a contact surface 104 thereof adapted to be in contact with a linear slider 106 which is driven in the X direction in FIG. 2A, and therefore, includes shoulder portions 113 respectively extending in the height direction (the Z direction) from two long side edges of the contact surface of a rectangular shape via rounded portions.

The two fixing portions 107 are disposed at a distance from the linear slider (not shown) in a direction parallel to the moving direction (the X direction) of the linear slider. Each converting portion 111 is disposed between the shoulder portion 113 and the fixing portion 107 concerned. Each converting portion 111 extends obliquely relative to the contact surface 104, and extends away from the contact surface 104 toward the side opposite from the contact surface 104 in the height direction (the Z direction).

The vibrating body 102 of the vibrator 101 is formed with a groove 112 having a sufficient depth such that each converting portion 111 has a spring function. Instead of forming the groove 112, the vibrating body 102 can be formed with raised projections at its positions where the fixing portions 107 are mounted, or the fixing portions can be formed to project toward the vibrating body 102. In that case, the groove 112 can be eliminated.

The contact members 109-1, 109-2 are formed by pressing a rectangular plate, and therefore, the fixing portions 107, the converting portions 111, and the protruding portion 103 are formed integrally with one another. The contact members are made of a stainless material which is excellent in stamping performance, and are formed to be substantially uniform in thickness between the fixing portions 107 which are fixed by welding or adhesive bonding to the vibrating body 102 as a base.

Next, functional characteristics of the converting portions 111 are described. As described above, the construction of this embodiment is attained by replacing the prior art contact members 503-1, 503-2, or 609 by the novel contact members 109-1, 109-2. The contact members 109-1, 109-2 disposed in the vicinity of nodes of MODE-A vibration are affected by the X-direction distortion components shown in FIG. 18A, and the distance between the fixing portions in each of the contact members 109-1, 109-2 increases and decreases in the in-plane direction.

Figure 20A:
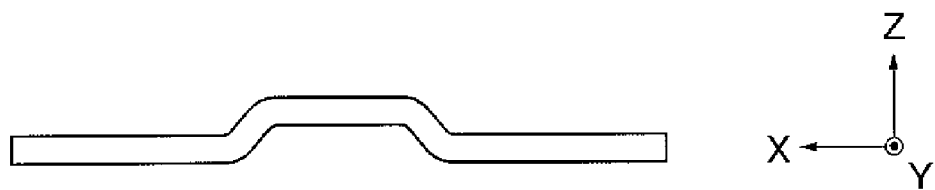
FIGS. 20A to 20C are views showing deformation states of the contact member of FIG. 19.

The converting portions 111 are so configured as to extend obliquely relative to the fixing portions 107 in a direction (the negative Z direction) opposite from the projecting direction of the protruding portion 103. As far as the protruding portion 103 is concerned, a behavior to the elongation and contraction in the in-plane direction is similar to that of FIGS. 20A to 20C, but the converting portions 111 show a behavior opposite to that of the protruding portion 103. Specifically, the converting portions 111 move the contact surface 104 upward in the Z direction when the fixing portions 107 are moved away from each other, and move the contact surface 104 downward in the Z direction when the fixing portions 107 are moved toward each other. In this manner, the converting portions 111 convert the elongation/contraction deformation of the fixing portions 107 in the X direction (more generally, a first axis direction) into the reciprocal motion of the contact surface 104 in the Z direction (more generally, a second axis direction).

In the above, only the function of the converting portions 111 has been described. The following is an explanation of a behavior of the contact member 109 observed when both the function of the converting portions 111 and the function of the protruding portion 103 are considered in total.

Figure 3B:
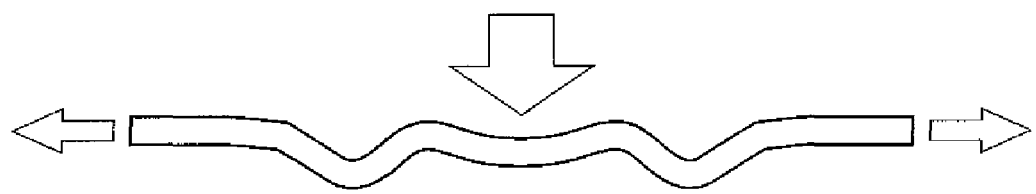
Figure 3C:
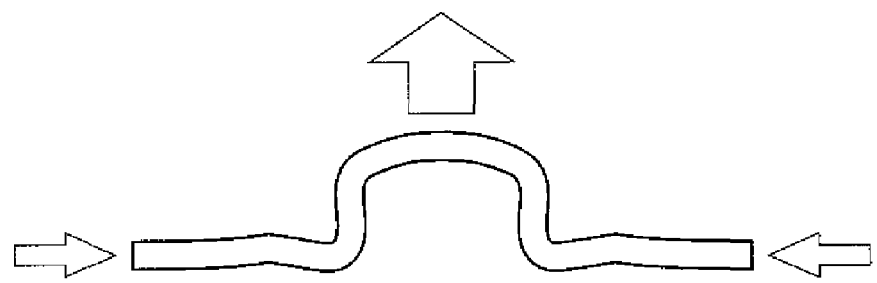

FIGS. 3A to 3C are views showing states of deformation of the contact member of FIGS. 2A and 2B as seen from the Y direction in the coordinate system of FIGS. 2A and 2B.

FIG. 3A shows a shape of the contact members 109-1, 109-2 observed when no vibration is generated in the vibrator 101, FIG. 3B shows a shape of the contact members observed when the fixing portions 107 are moved away from each other, and FIG. 3C shows a shape of the contact members observed when the fixing portions are moved toward each other. Larger arrows each represent the direction of deformation of the contact surface 104. The following is a comparison with FIGS. 20A to 20C each showing a deformation of the contact member 609 that does not have the converting portions 111.

Figure 20B:
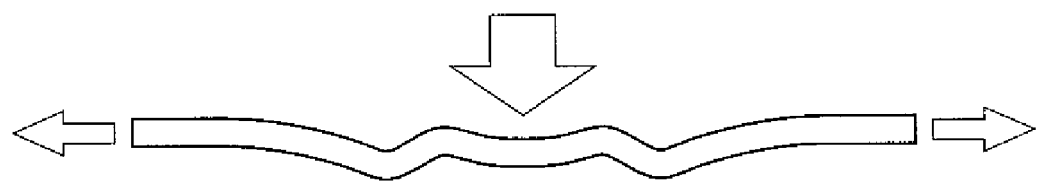
Figure 20C:
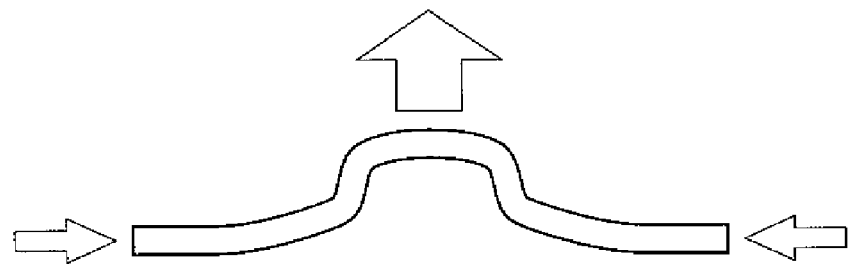

As understood from the comparison between FIG. 3B and FIG. 20B, the direction of deformation of the contact surface 104 observed when the fixing portions 107 are moved away from each other coincides with the direction of deformation of the contact surface 604 observed when the fixing portions 607 are moved away from each other, both of which are a downward direction relative to the paper plane of FIGS. 3B and 20B. As seen from FIGS. 3C and 20C, the direction of deformation of the contact surface 104 observed when the fixing portions 107 are moved toward each other coincides with the direction of deformation of the contact surface 604 observed when the fixing portions 607 are moved toward each other, both of which are an upward direction relative to the paper plane of FIGS. 3C and 20C. Although the direction of deformation of the converting portions 111 is opposite in sign from that of the protruding portion 103, the sign of the direction of deformation of the contact surface 104 or 604 relative to the motion of the fixing portion 107 or 607 is the same between FIGS. 3B, 3C and FIGS. 20B, 20C since the influence of deformation of the protruding portion 103 is stronger than that of deformation of the converting portions 111.

Figure 4:
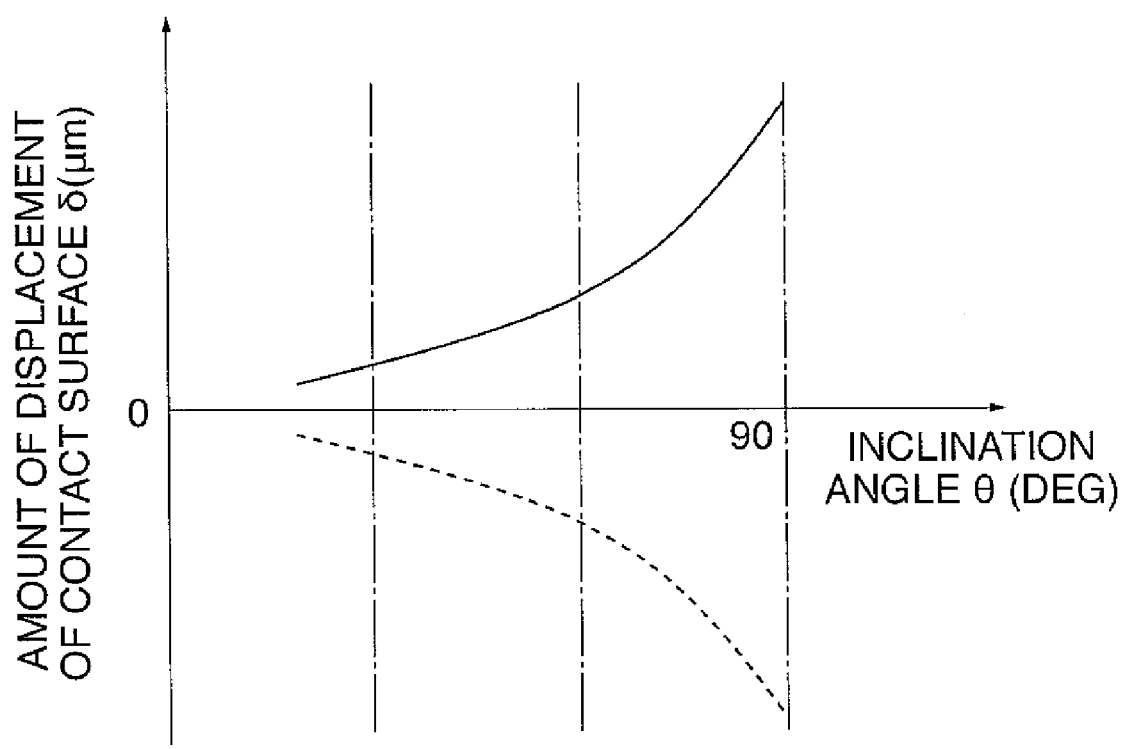
FIG. 4 is a view showing a relation between inclination angle $\theta$ of converting portions and Z-axis direction displacement $\delta$ of the contact surface observed when fixing portions of the contact member of FIG. 2B are moved by a distance of 1 µm toward and away from each other.

FIG. 4 is a view showing a relation between inclination angle θ of the converting portions and Z-axis direction displacement δ of the contact surface observed when the fixing portions of the contact member of FIG. 2B are moved by a distance of 1 μm toward and away from each other, as shown respectively by a solid curve and a dotted curve.

Figure 19:
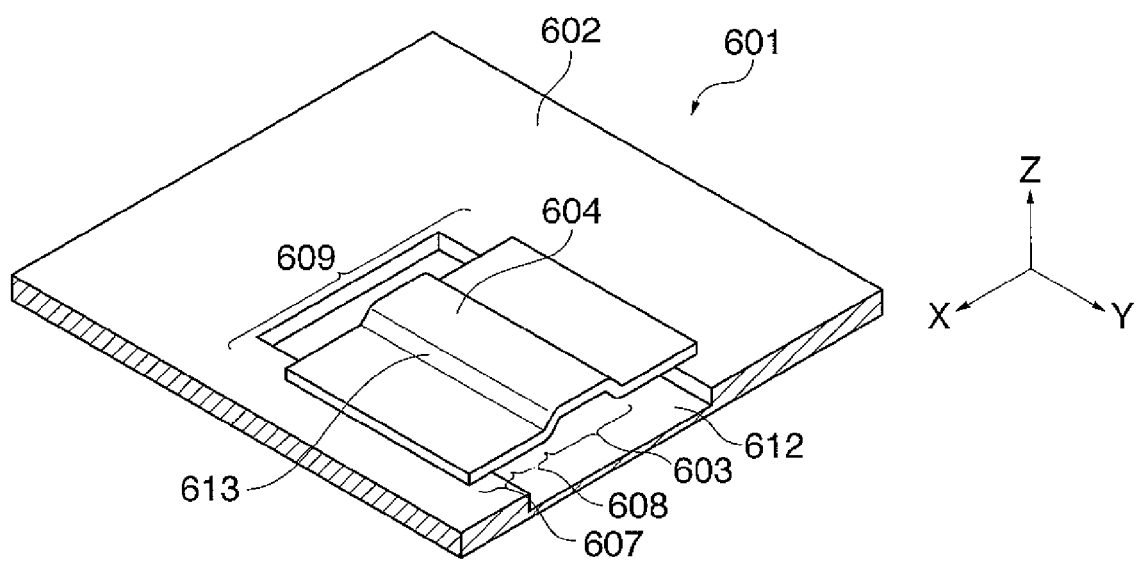
FIG. 19 is a perspective view of a vibrating body mounted with a contact member having a spring function.

As shown in FIG. 3A, the inclination angle θ is an angle formed between the inclined surface of the converting portion 111 and the vertical direction (Z axis direction), with the contact surface 104 extending horizontally. When the inclination angle of the converting portion 111, which is taken along the abscissa in FIG. 4, is equal to 90 degrees, the fixing portion 107 and the converting portion 111 are in the same plane as with the case of the contact member of FIG. 19 in which no converting portions 111 are provided.

Assuming that θ=90 degrees in FIG. 4, an amount of displacement of only the protruding portion 103 is generated since no converting portions 111 are present. It is understood that the amount of displacement has its maximum value when the relation of θ=90 degrees is satisfied. With the decrease in inclination angle, the inclined planes of the converting portions become steeper and an undesired deformation in the Z direction is partly canceled by the converting portions 111, resulting in reduction in contact surface displacement δ.

Figure 21A:
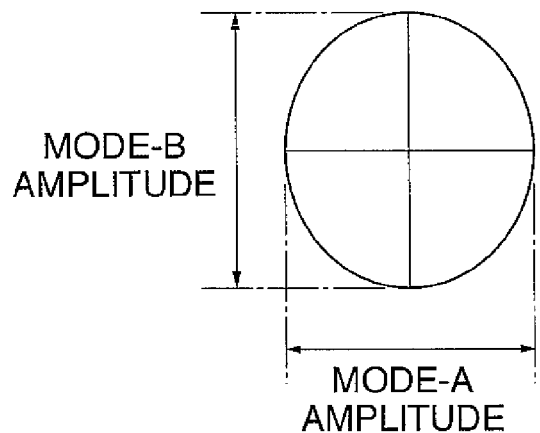
FIGS. 21A to 21C are views showing elliptic trajectories of the contact surface of the contact member of FIG. 19.
Figure 21B:
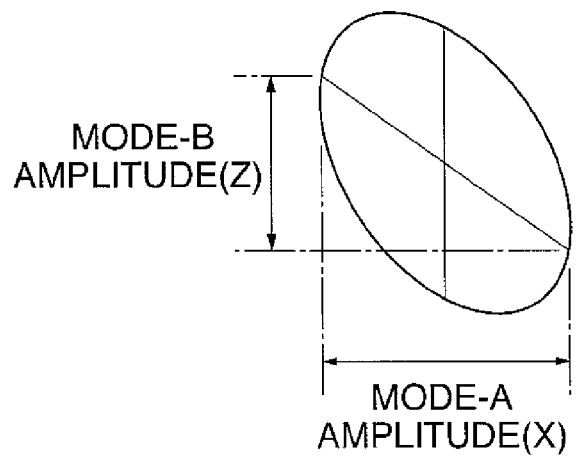
Figure 21C:
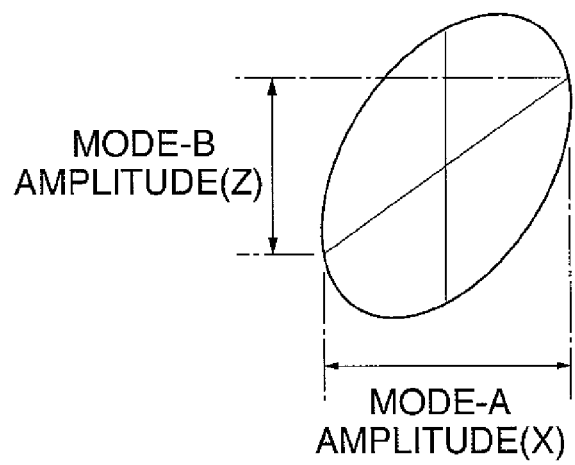

By decreasing the inclination angle θ such that the displacement δ has a sufficiently small value, the elliptic trajectory of the vibrator 101 is improved from that of FIGS. 21B and 21C to that of FIG. 21A. To cope with the demand of bringing the displacement δ as close to zero as possible, the mounting positions of the contact members 109 can be shifted in the X axis direction.

The amount of displacement of the contact surface 104 in the out-of-plane direction caused by the elongation and contraction of the fixing portions 107 in the in-plane direction, which is shown in FIG. 4, can be adjusted by changing the length and thickness of the converting portions 111, etc. The curves shown in FIG. 4 represent an exemplary tendency observed in a given condition determined as a function of the length and thickness of the converting portions, etc. It has been found that similar effects can be achieved even if inclined parts of the converting portions 111 are each formed into a rolled/curved surface other than a flat surface.

The above described first embodiment shows an example where the converting portions 111 are provided to suppress an undesired amplitude of the contact surface 104. In a second embodiment, there is described a construction in which the converting portions can be disposed at such positions where an undesired amplitude of the contact surface is suppressed and much larger amplitude of the contact surface can be attained. In the vibrator of this embodiment, vibration modes are excited which are the same as the two vibration modes (MODE-A and MODE-B) of FIGS. 18A and 18B.

Figure 5A:
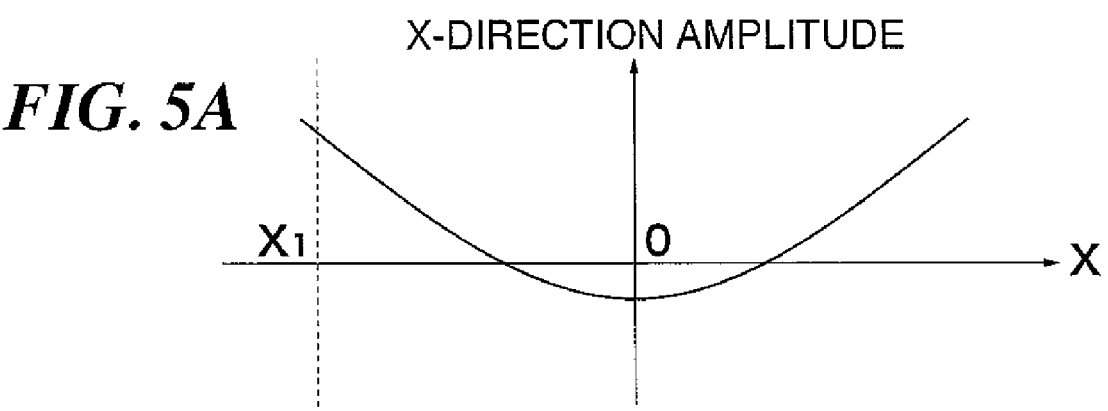
FIG. 5A is a view showing a relation in MODE-A between X coordinate value on a vibrating body and X-axis direction amplitude of a surface of the vibrating body in a second embodiment of this invention.
Figure 5B:
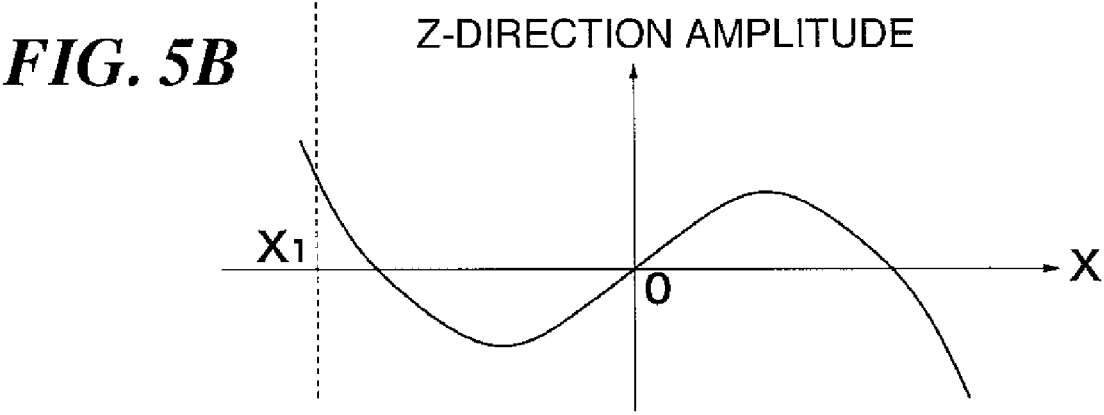
FIG. 5B is a view showing a relation between X coordinate value and Z-axis direction amplitude.

FIG. 5A is a view showing a relation in MODE-A between X coordinate value on a vibrating body of the second embodiment and X-axis direction amplitude of a surface of the vibrating body, and FIG. 5B is a view showing a relation between X coordinate value and Z-axis direction amplitude.

In FIGS. 5A and 5B, the X coordinate value on the vibrating body is taken along the abscissa. As seen from the Y axis direction in FIG. 6, the center of the vibrating body is positioned at the X axis origin (X=0) Node positions shown in FIG. 5A are in the vicinity of crest and trough positions shown in FIG. 5B.

The prior art protruding portions 503-1, 503-2 are disposed in the vicinity of the node positions in FIG. 5B so as not to generate in the MODE-A an undesired displacement δ of the contact surface in the Z axis direction.

As understood from FIG. 5A, the X-direction vibration has its maximum amplitude in opposite end portion regions in which the absolute X coordinate value is larger than that at the node positions in FIG. 5B. Since an undesired Z-direction amplitude is also generated in the end portion regions, these regions have not been used heretofore. The second embodiment uses contact members one of which is shown in FIG. 6, making it possible to dispose the contact surfaces in the end portion regions.

Figure 6:
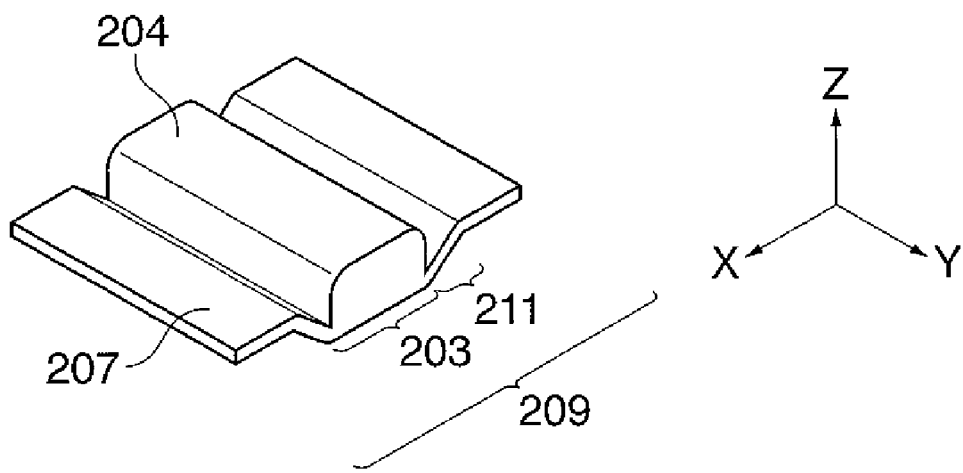
FIG. 6 is a perspective view showing a contact member of the vibrating body of the second embodiment.
Figure 7:
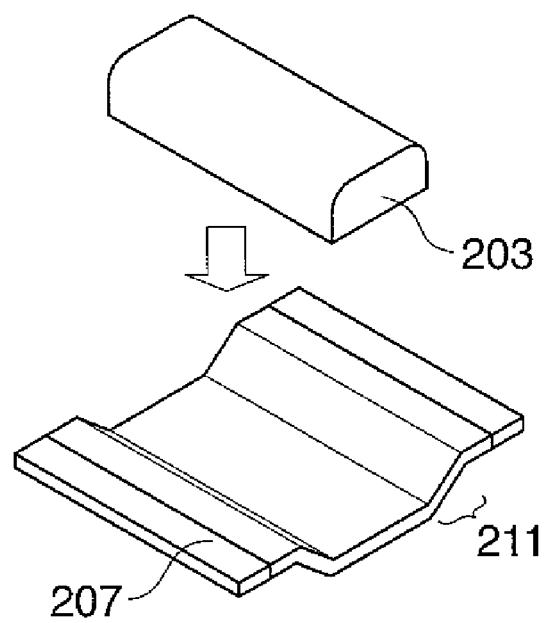
FIG. 7 is an exploded perspective view of the contact member shown in FIG. 6.

FIG. 6 is a perspective view showing the contact member of the vibrating body according to the second embodiment of this invention. As shown in FIG. 7, the contact member 209 is a plate-like article which is comprised of fixing portions 207 and converting portions 211 and to which a protruding portion 203 is fixedly mounted.

Except for the below described change to the protruding portion 203, the construction is the same as that of FIGS. 2A and 2B, and therefore, an explanation thereof is omitted. In the first embodiment, the shoulder portions 113 are provided to form the protruding portion 103, and the contact surface 104 is displaced in the Z direction when the two fixing portions 107 are moved toward and away from each other in the in-plane direction.

In this embodiment, a lower portion of the protruding portion 203, below the contact surface, is changed from a hollow structure to a solid structure so that the protruding portion 203 can be regarded as a rigid body. Thus, the contact surface of the protruding portion 203 is not displaced in the Z direction when the fixing portions 207 are elongated and contracted in the in-plane direction. For this reason, as for the direction of deformation observed when the contact member 209 is elongated and contracted in the in-plane direction, it is enough to only consider a behavior of the converting portions 211.

Figure 8A:
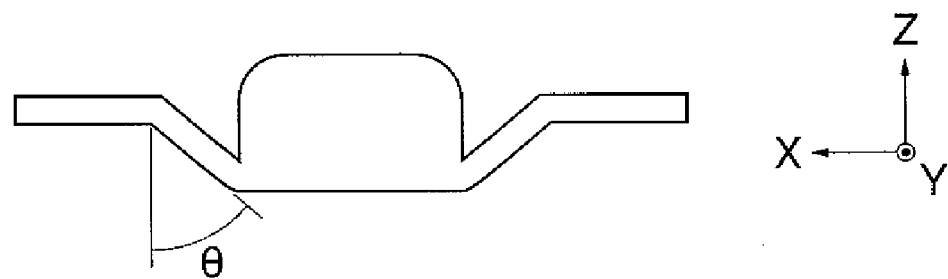
FIG. 8A to FIG. 8C are views showing states of deformation of the contact member of FIG. 6.
Figure 8B:
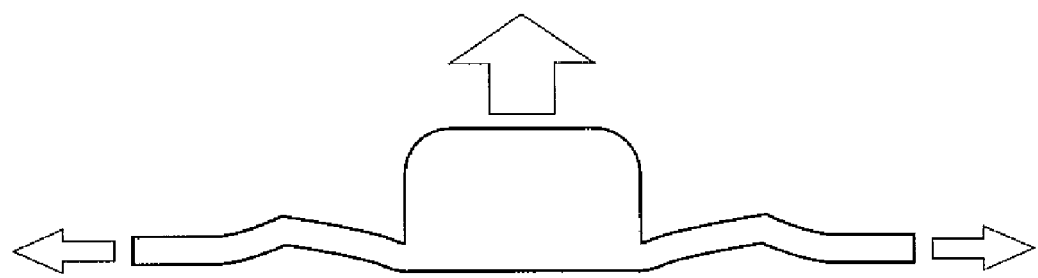
Figure 8C:
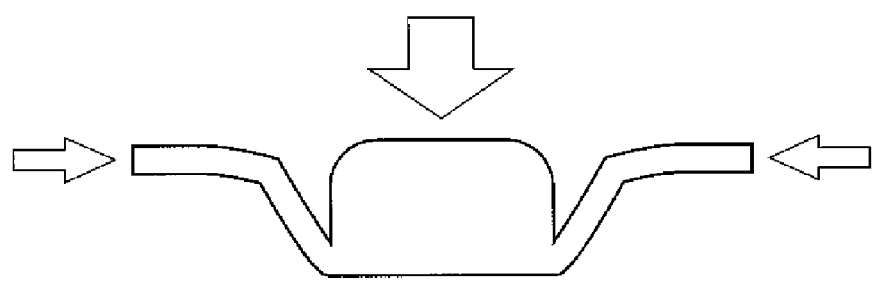

FIGS. 8A to 8C are views in which the deformation of the contact member of FIG. 6 is seen from the Y direction of a coordinate system shown in FIG. 6.

FIG. 8A shows a shape of the contact member 209 observed when no vibration is generated in the vibrator, FIG. 8B shows a shape of the contact member observed when the fixing portions 207 are moved away from each other, and FIG. 8C shows a shape of the contact member observed when the fixing portions 207 are moved toward each other. Larger arrows show the direction of deformation of the contact surface 204.

When the fixing portions 207 are moved away from each other, the converting portions 211 cause the contact surface 204 to move upward in the Z direction (i.e., to move in the positive Z direction). When the fixing portions 207 are moved toward each other, the converting portions 211 cause the contact surface 204 to move downward in the Z direction (i.e., to move in the negative Z direction). As understood from the comparison between FIGS. 5A to 5C, FIGS. 3A to 3C, and FIGS. 20A to 20C, the direction in which the contact surface 204 of this embodiment is deformed by the motions of the fixing portions 207 is opposite from that observed in the cases of FIGS. 3A to 3C and FIGS. 20A to 20C.

It is assumed here that the contact member 209 is disposed at a position X=X1 in FIGS. 5A and 5B. As seen from FIG. 5B, the Z direction displacement in the MODE-A is large at the position X=X1, and therefore, the contact surface 204 has an elliptic trajectory as shown in FIG. 21B or 21C.

Figure 18A:
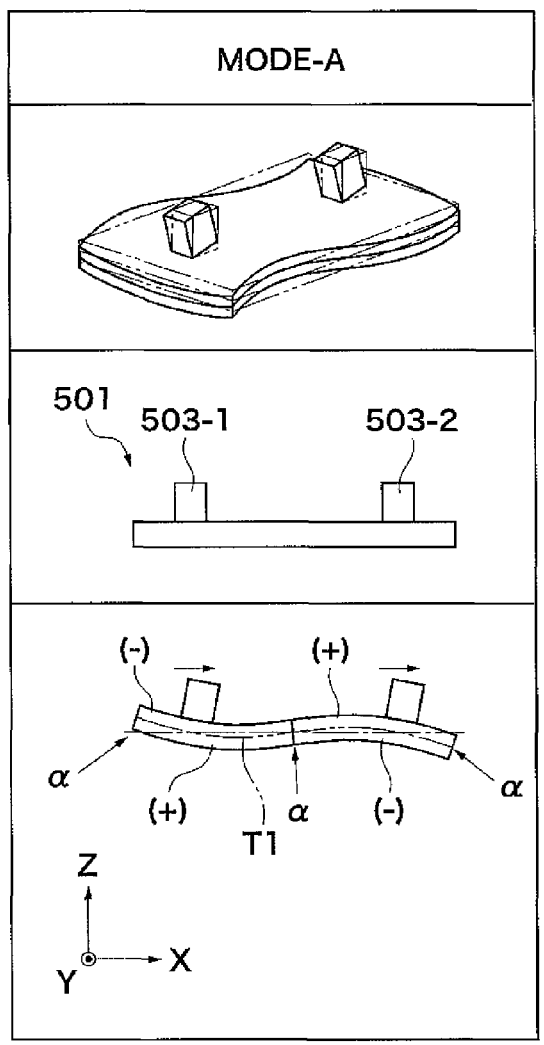
FIGS. 18A and 18B are views each showing a vibration mode excited in a vibrating body of FIG. 17.
Figure 18B:
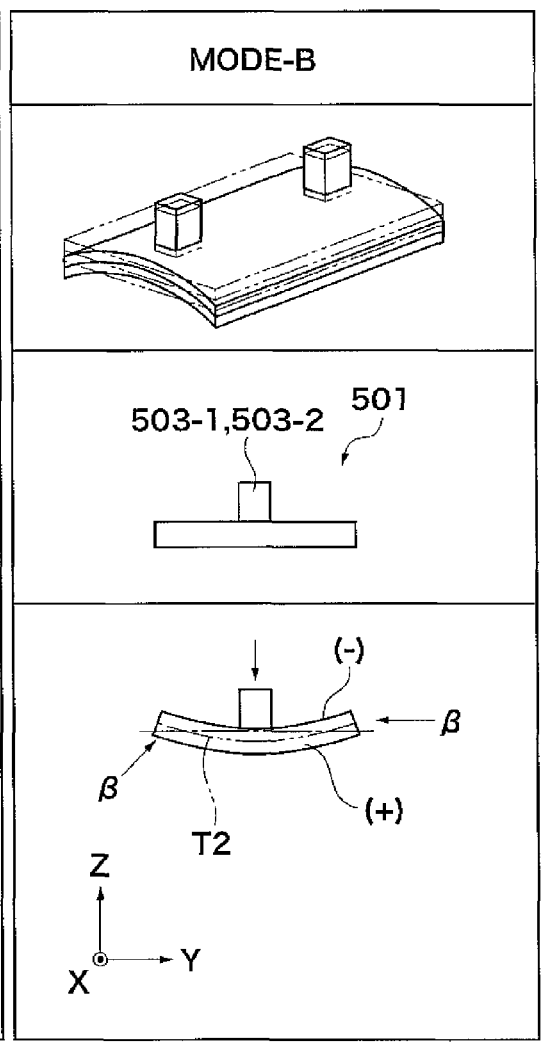

On the other hand, the distortion of the surface of the vibrating body has the negative sign (−) at the position X=X1, as shown in FIG. 18A. This indicates that at the position X=X1 the surface is contracted in the X direction. Thus, the fixing portions 207 of the contact member 209 are moved toward each other, and the contact surface 204 is displaced in the negative Z direction as shown in FIG. 5C. By making settings to cancel out the above described two displacements each other, the Z direction amplitude in the MODE-A at the position X=X1 can be reduced to approximately zero, and the elliptic trajectory can have the form as shown in FIG. 21A. By suppressing the influence on the Z direction amplitude caused by the in-plane contraction of the vibrating plate surface in the X direction in this manner, it is possible to reduce the distortion of the elliptic trajectory of the vibrating body surface at the position X=X1 where the Z direction amplitude is large. As a result, unlike the prior art, the contact member 209 can be disposed at the position X=X1 where the Z direction amplitude of the vibrating body surface is large.

Figure 9:
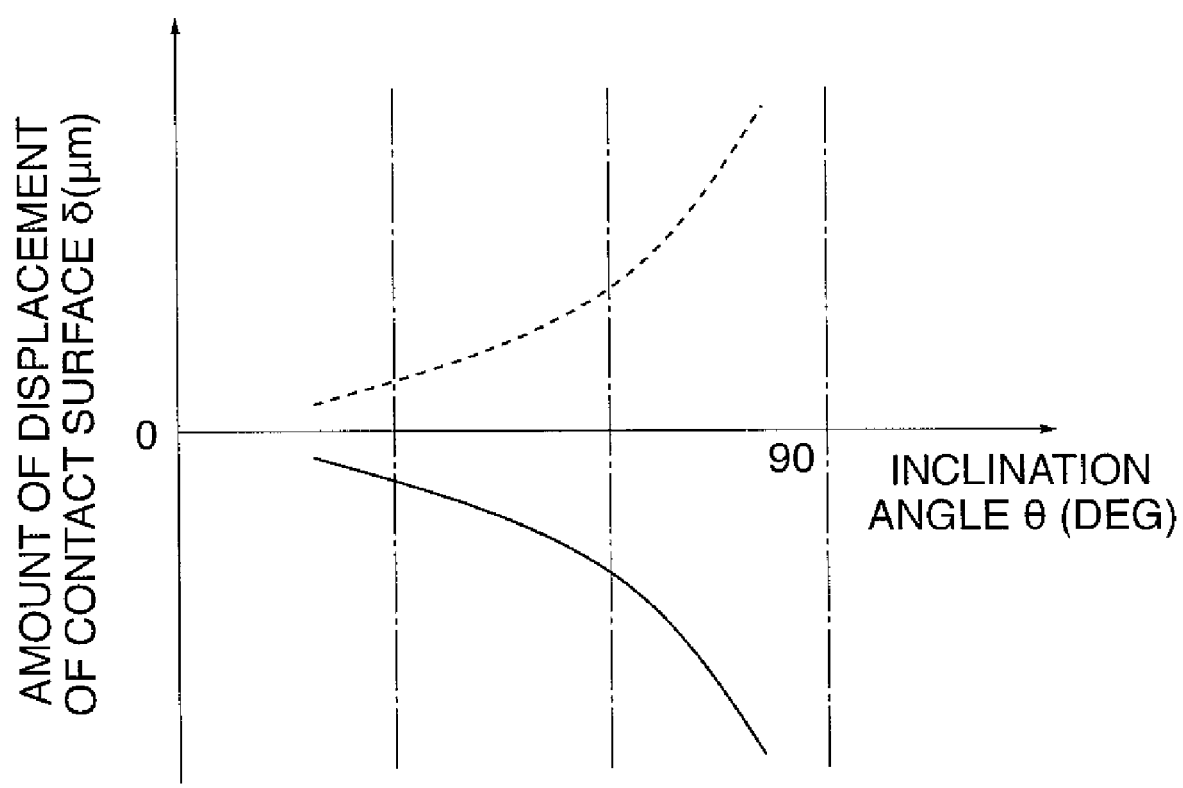
FIG. 9 is a view showing a relation between inclination angle $\theta$ of converting portions and Z-axis direction displacement $\delta$ of a contact surface observed when fixing portions of the contact member of FIG. 6 are moved by a distance of 1 µm toward and away from each other.

FIG. 9 is a view showing a relation between inclination angle θ of the converting portions and Z-axis-direction displacement δ of the contact surface observed when the fixing portions of the contact member in FIG. 6 are moved by a distance of 1 μm toward and away from each other as shown respectively by a solid curve and a dotted curve.

As shown in FIG. 9, the inclination angle θ is an angle formed between the inclined surface of the converting portion 211 and the vertical direction (the Z axis direction), with the contact surface 204 extending horizontally. When the inclination angle of the converting portion 211, which is taken along the abscissa in FIG. 9, is equal to 90 degrees, the fixing portion 207 and the converting portion 211 are in the same plane as with the case of the contact member of FIG. 19 in which no converting portions 211 are provided.

As with the first embodiment, the amount of displacement of the contact surface 204 in the out-of-plane direction caused by the elongation and contraction of the fixing portions 207 in the in-plane direction, which is shown in FIG. 9, can be adjusted by changing the length and thickness of the converting portions 211, etc. The curves shown in FIG. 9 represent an exemplary tendency observed in a given condition determined as a function of the length and thickness of the converting portions, etc.

The protruding portion 3 can have a shape that can substantially be regarded as a rigid body. For example, the plate thickness of the shoulder portion, which forms a side wall of the protruding portion 203 of the contact member 209 shown in FIG. 2B, can be sufficiently thickened so as to prevent the deformation of the protruding portion 203 due to the elongation and contraction of the fixing portions 207 in the X direction. Also in that case, the protruding portion 203 can be regarded as a rigid body, and therefore, intended effects can be attained.

The following is an explanation of a third embodiment of this invention, which is an example where the contact member of FIG. 6 explained in the second embodiment is mounted on a ring-type ultrasonic motor.

FIGS. 10A and 10B are upper and lower perspective views each showing a vibrating body of the third embodiment.

As shown in FIGS. 10A and 10B, a vibrator 301 of the ring-type ultrasonic motor is comprised of an annular elastic body 315 and a piezoelectric element 305. A comb-like protrusion group 316 is formed on one axial side of the elastic body 315. A friction material 317 is adhesive bonded to an upper surface of the protrusion group 316. An annular piezoelectric element 305 as an electromechanical energy conversion element is adhesive bonded to another axial side of the elastic body 315, which is formed with a patterned electrode 318.

The patterned electrode 318 is equally divided into electrode parts, the number of which is equal to four times as large as the degree of a vibration mode excited in the annular portion of the vibrator 301. The electrode parts are sequentially supplied with a sinusoidal AC voltage with a 90-degree time phase difference.

When supplied with an AC voltage of a frequency near the natural frequency of a vibration mode to be excited, the piezoelectric element 305 is elongated and contracted, and the elastic body 315 resonates because of a bending moment applied thereto. Vibrations (modes) excited by the AC voltage with the 90-degree time phase difference are the same in shape but different in phase from one another, and a combined vibration generates a progressive vibration wave (progressive wave).

FIG. 11 is a perspective view showing an example where contact members are mounted to the ring-type ultrasonic motor.

As shown in FIG. 11, two fixing portions 307 of each contact member 309 are respectively mounted on adjacent protrusions of the protrusion group 316, and a contact surface 304 of the contact member 309 is disposed near the center between the adjacent protrusions. The vibrator 301 (see FIGS. 10A and 10B) includes contact members 309 the number of which is the same as the number of protrusions of the comb-like protrusion group 316. These contact members 309 are circumferentially arranged on the entire circumference of the vibrator 301. The contact members 309 has the same construction as that of the contact member 209 shown in FIG. 6.

In this embodiment, there are used a plurality of the contact members 309 each having one contact surface 304 formed on a protruding portion 303, which is positioned between a converting portion 311 formed on each side thereof. Alternatively, a ring-shaped contact member can be used in order to reduce costs and simplify a fabrication process. Although the number of the protrusions is the same as that of the contact members 309 in this embodiment, this is not limitative since it is sometimes advantageous to make the number of the protrusions not equal to the number of the contact members depending on the way of arrangement of the contact surfaces 304.

Figure 12:
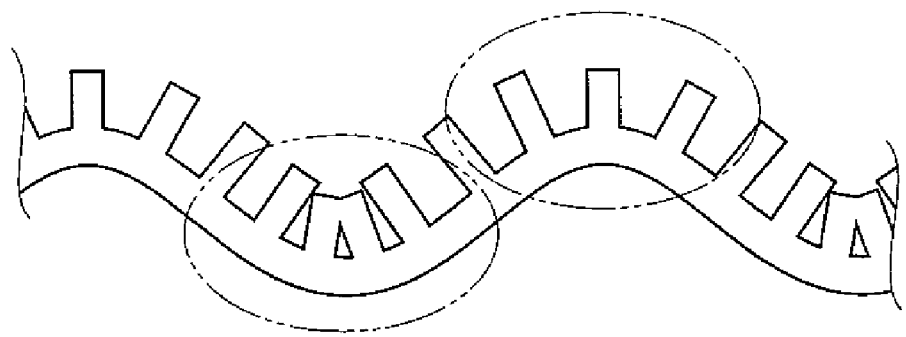
FIG. 12 is a fragmentary view showing a relation between driving vibration and a protrusion group as seen from the contour of a ring-shaped vibrating body of FIGS. 10A and 10B.

FIG. 12 is a fragmentary view showing a relation between driving vibration and the protrusion group as seen from the contour of the ring-shaped vibrating body shown in FIGS. 10A and 10B.

As shown in FIG. 12, a plurality of protrusions are included in the length of one wavelength of the progressive wave. A relative circumferential distance between adjacent protrusions changes depending on the positional relation between protrusions and wave crests/troughs. Protrusion tip ends are made to be spaced from each other at wave crests, as shown at a right-side part of FIG. 12 surrounded by dotted-chain line, and made close to each other at wave troughs, as shown at a left-side part of FIG. 12 surrounded by dotted-chain line. The change in circumferential distance produces effects which are the same or similar to those produced by the X-direction elongation and contraction in the above described first and second embodiments.

As shown in FIG. 12, the distance between adjacent protrusion is made larger at positions near crest peaks, and therefore, the contact member 9 is deformed as shown in FIG. 8B, whereby the axis-direction amplitude can be increased. Since the distance between protrusions of the ring-shaped vibrator 301 is sufficiently large, the converting portions of the contact member 309 can be made large in length. As a result, the degree of conversion of the change in inter-fixing-portion distance into the displacement of the contact surface can be set to be large.

Using the above described construction, therefore, the contact surfaces 304 can each have an elliptic trajectory with the increased axial amplitude. Furthermore, using the contact members 309, the contact surfaces 304 on the vibrator 301 side can each have a spring function, whereby stable driving can be achieved.

The following is an explanation of a fourth embodiment of this invention, which is an example where the contact member of FIG. 6 explained in the second embodiment is mounted on a woodpecker-type actuator.

Figure 13:
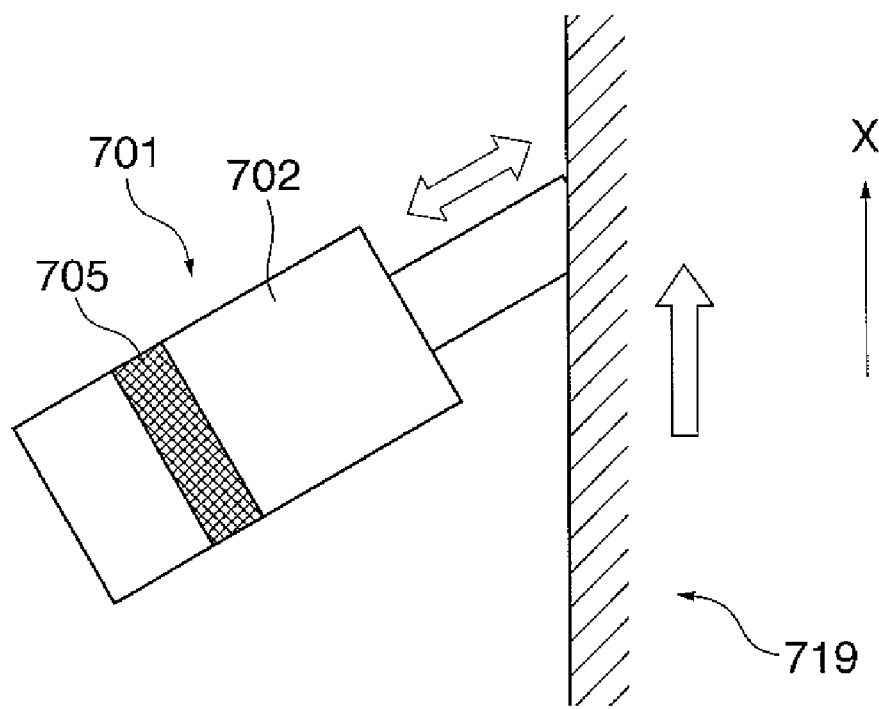
FIG. 13 is a view showing the construction of a woodpecker-type actuator mounted with the contact member of FIG. 6.

FIG. 13 is a view showing the construction of a woodpecker-type actuator mounted with the contact member of FIG. 6.

As shown in FIG. 13, when supplied with an AC voltage of a frequency near the natural frequency of a longitudinal vibration mode to be excited, a piezoelectric element 705 held by a vibrator 701 having a vibrating body 702 is repeatedly elongated and contracted in the axis direction. As a result, a tip end portion of the vibrator 701 strikes a surface of a driven body 719, as a woodpecker does. Thus, a frictional driving force is conveyed to the driven body 719, and the driven body 719 is driven in the direction shown by an arrow in FIG. 13.

Figure 14:
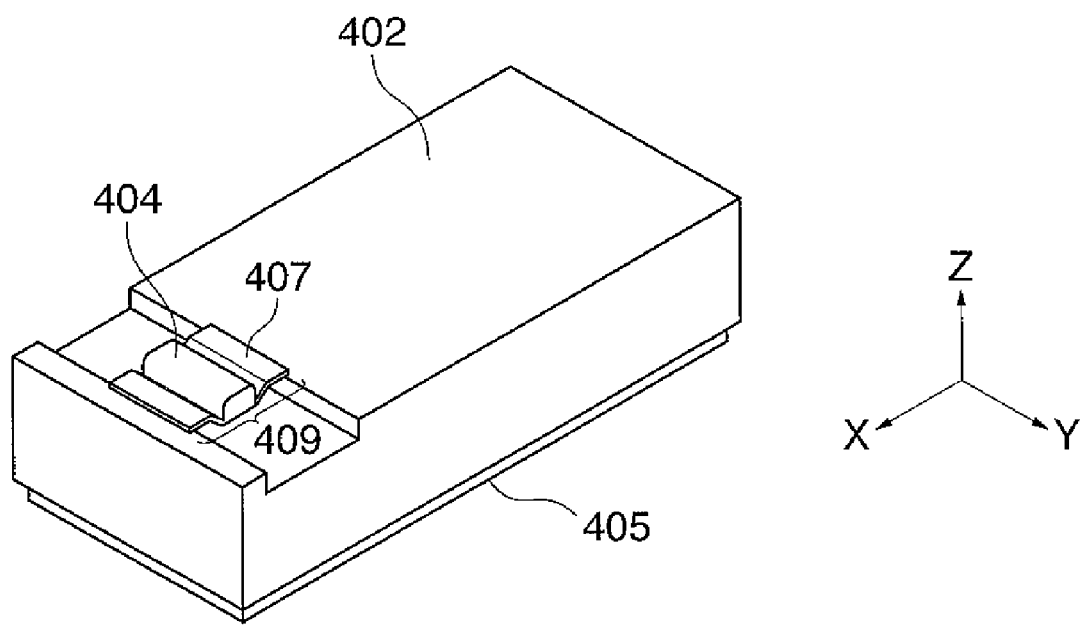
FIG. 14 is a perspective view of a vibrating body according to a fourth embodiment.

FIG. 14 is a perspective view of a vibrating body according to the fourth embodiment.

As shown in FIG. 14, a piezoelectric element 405 is fixedly attached to one surface of the vibrating body 402 formed into a quadratic prism-shape, and a contact member 409 is disposed on another surface of the vibrating body 402 on the side remote from the piezoelectric element 405.

Figure 15:
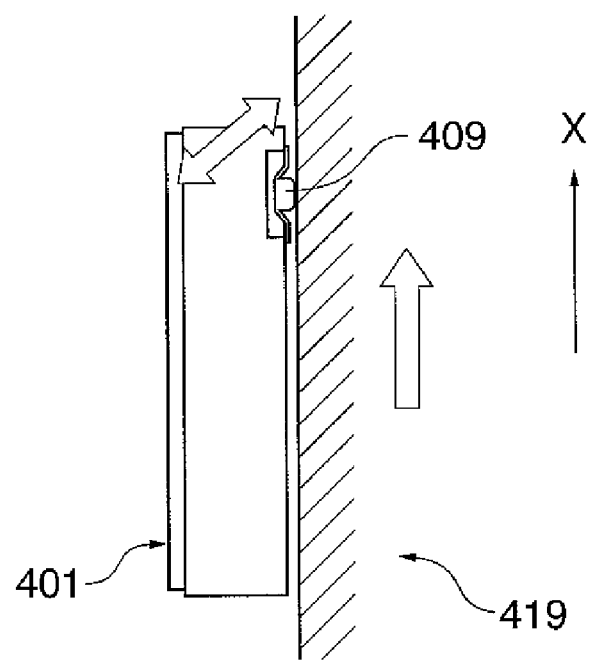
FIG. 15 is a view showing a positional relation between the vibrating body of FIG. 14 and a driven body.

FIG. 15 is a view showing a positional relation between the vibrating body 402 of FIG. 14 and a driven body 419.

As shown in FIG. 15, the driven body 419 is disposed in parallel to a vibrator 401 so as to be in light contact therewith.

To drive the vibrator 401, the vibrator 401 is excited at a frequency near the resonance frequency of a first-order longitudinal wave, for example. In that case, a node of the first-order longitudinal wave is formed at a position near the axial center of the vibrator 401, and opposite end portions of the vibrator 401 are displaced in opposite directions.

Figure 16:
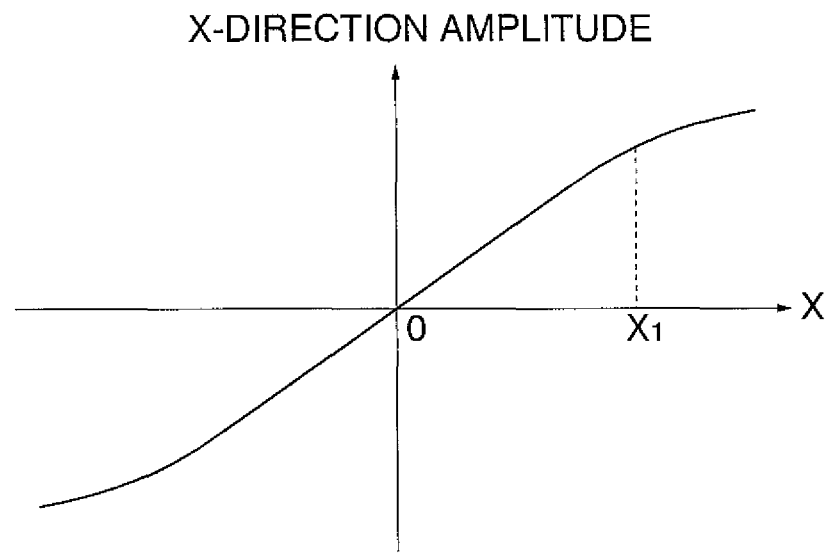
FIG. 16 is a view for explaining an amount of displacement between the vibrating body of FIG. 14 and the driven body.
Figure 17:
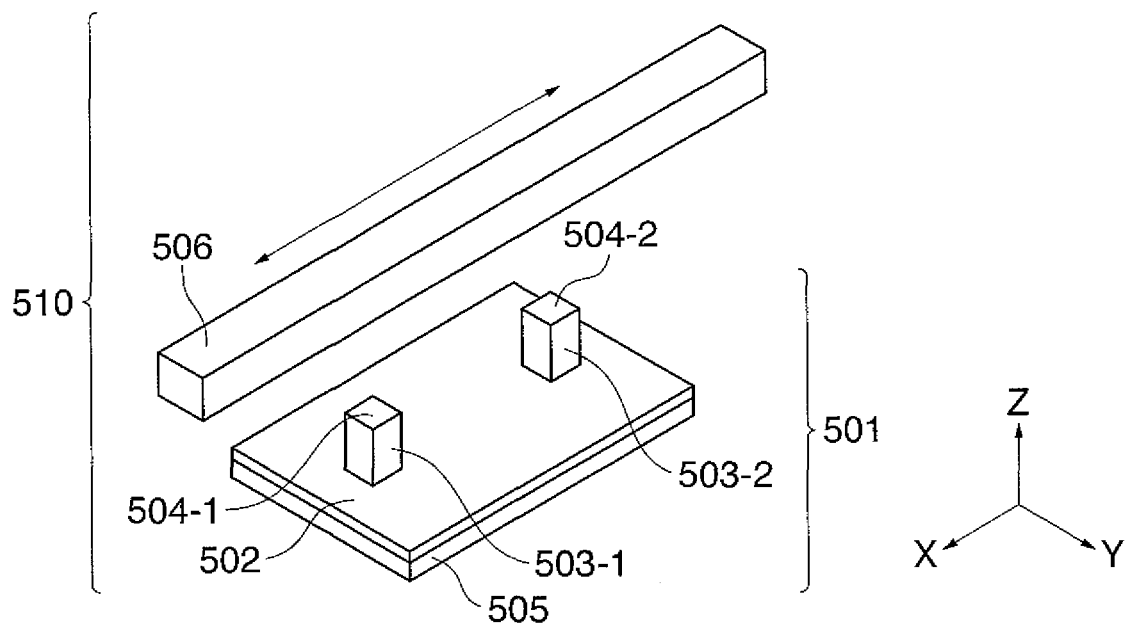
FIG. 17 is a perspective view showing the appearance of a prior art linear-type ultrasonic motor.

FIG. 16 is a view for explaining an amount of displacement between the vibrating body of FIG. 14 and the driven body.

In FIG. 16, the X coordinate value in the XYZ coordinate system of FIG. 14 is taken along the abscissa, with the X axis origin (X=0) positioned at the center of the vibrating body (the node position), and an amount of X-axis direction displacement is taken along the ordinate.

Since the contact member 409, which is the same in construction as the contact member 209 of FIG. 6 in the second embodiment, is disposed at a position X=X1, the fixing portions 407 of the contact member 409 are moved away from each other when deformation is produced in a side surface of the vibrator 401 near a tip end portion thereof to which the contact member 409 is mounted. Specifically, the contact surface 404 is pushed out toward the driven body 419 in synchronization with first-order longitudinal-wave vibration.

As a result, the contact surface 404 makes a reciprocal motion in the direction shown by an arrow in FIG. 15, and conveys a driving force to the surface of the driven body 419 as a woodpecker does, to thereby drive the driven body 419.

Unlike the prior art vibrating body in which the vibrating body is required to be disposed obliquely relative to the contact surface on the driven body side, the vibrator 401 of this embodiment can be disposed parallel to the contact surface of the driven body, thereby making it possible greatly reduce a space occupied by the vibrator 401. Furthermore, by using the contact member 409 of this embodiment, the contact surface 404 on the vibrator 401 side can have a spring function, whereby smooth contact can be attained and stable driving can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A vibration-type actuator comprising:
   a vibrating body adapted to generate a bending vibration;
   a driven body adapted to be driven by the bending vibration generated in said vibrating body; and
   a contact member having a protruding portion fixed to said vibrating body via a plurality of fixing portions and adapted to be in contact with said driven body,
   wherein said contact member further includes converting portions each disposed between said protruding portion and one of said plurality of fixing portions,
   wherein said converting portions each have a portion thereof extending obliquely relative to a contact surface provided in said protruding portion for contact with said driven body and extending away from the contact surface in a direction opposite of a protruding direction of said protruding portion,
   wherein said converting portions are adapted to convert a change in relative distance in a first direction between the plurality of fixing portions caused by deformation of said vibrating body into a displacement in a second direction, which is perpendicular to the first direction, wherein said protruding portion is adapted to be deformed by the distance change between the plurality of fixing portions along the first direction, wherein deforming the protruding portion displaces the contact surface in one direction along the second direction while deforming the converting portions displaces the contact surface in a direction opposite to the one direction along the second direction, wherein said protruding portion is adapted to be deformed by the distance change between the plurality of fixing portions along the first direction, and wherein deforming the protruding portion displaces the contact surface in one direction along the second direction, while deforming the converting portions displaces the contact surface in a direction opposite to the one direction along the second direction.

2. The vibration-type actuator according to claim 1, wherein said converting portions each have a flexibility in a direction normal to the contact surface.

3. The vibration-type actuator according to claim 1, wherein the plurality of fixing portions are spaced from one another in a direction of motion of said driven body.

4. The vibration-type actuator according to claim 1, wherein said protruding portion has a solid structure at the portion thereof below the contact surface for contact with said driven body.

5. A vibration-type actuator comprising:
a vibrating body adapted to generate a bending vibration;
a driven body adapted to be driven by the bending vibration generated in said vibrating body; and
a contact member having a protruding portion fixed to said vibrating body via a plurality of fixing portions and adapted to be in contact with said driven body,
wherein said contact member further includes converting portions each disposed between said protruding portion and one of said plurality of fixing portions,
wherein said converting portions each have a portion thereof extending obliquely relative to a contact surface provided in said protruding portion for contact with said driven body and extending toward a side opposite from the contact surface,
wherein said converting portions are adapted to convert a change in relative distance in a first direction between the plurality of fixing portions caused by deformation of said vibrating body into a displacement in a second direction, which is perpendicular to the first direction,
wherein said vibrating body is adapted to generate deformation that includes elongation and contraction of said vibrating body in the first direction and displacement of said vibrating body in the second direction, and
wherein the displacement of said vibrating body in one direction along the second direction deforms said converting portions to displace the contact surface in a direction opposite to the one direction along the second direction.

6. A vibration-type actuator comprising:
a vibrating body adapted to generate a bending vibration;
a driven body adapted to be driven by the bending vibration generated in said vibrating body; and
a contact member having a protruding portion fixed to said vibrating body via a plurality of fixing portions and adapted to be in contact with said driven body,
wherein said contact member further includes converting portions each disposed between said protruding portion and one of said plurality of fixing portions,
wherein said converting portions each have a portion thereof extending obliquely relative to a contact surface provided in said protruding portion for contact with said driven body and extending toward a side opposite from the contact surface,
wherein said converting portions are adapted to convert a change in relative distance in a first direction between the plurality of fixing portions caused by deformation of said vibrating body into a displacement in a second direction, which is perpendicular to the first direction, and
wherein said protruding portion has a hollow structure at the portion thereof below the contact surface for contact with said driven body.

7. A vibration-type actuator comprising:
a vibrating body adapted to generate a bending vibration;
a driven body adapted to be driven by the bending vibration generated in said vibrating body; and
a contact member having a protruding portion and a plurality of fixing portions fixing said protruding portion to said vibrating body, said protruding portion being adapted to be in contact with said driven body,
wherein said contact member further includes converting portions each disposed between said protruding portion and one of said plurality of fixing portions,
wherein said converting portions each have a portion thereof extending obliquely relative to a contact surface that contacts with said driven body provided in said protruding portion and extending toward a side opposite from the contact surface,
wherein the bending vibration in the vibrating body changes a distance between the plurality of fixing portions along a first direction,
wherein said converting portions are adapted to convert the distance change between the plurality of fixing portions along the first direction into a displacement of the contact surface along a second direction, which is perpendicular to the first direction,
wherein said protruding portion is adapted to be deformed by the distance change between the plurality of fixing portions along the first direction, and
wherein deforming the protruding portion displaces the contact surface in one direction along the second direction while deforming the converting portions displaces the contact surface in a direction opposite to the one direction along the second direction.

8. A vibration-type actuator for driving a driven body, the vibration-type actuator comprising:
a vibrating body adapted to generate a bending vibration; and
a contact member contacting with the driven body and having a protruding portion fixed to said vibrating body via a plurality of fixing portions and adapted to be in contact with said driven body,
wherein said contact member further includes converting portions each disposed between said protruding portion and one of said plurality of fixing portions,
wherein said converting portions each have a portion thereof extending obliquely relative to a contact surface provided in said protruding portion for contact with said driven body and extending away from the contact surface in a direction opposite of a protruding direction of said protruding portion, wherein said converting portions are adapted to convert a change in relative distance in a first direction between the plurality of fixing portions caused by deformation of said vibrating body into a displacement in a second direction, which is perpendicular to the first direction, wherein said protruding portion is adapted to be deformed by the distance change between the plurality of fixing portions along the first direction, and wherein deforming the protruding portion displaces the contact surface in one direction along the second direction while deforming the converting portions displaces the contact surface in a direction opposite to the one direction along the second direction.

* * * * *